United States Patent
Tylutki et al.

(10) Patent No.: US 9,328,645 B2
(45) Date of Patent: May 3, 2016

(54) DETECTING OVER-TEMPERATURE IN EXHAUST SYSTEM

(71) Applicant: GM GLOBAL TECHNOLOGY OPERATIONS LLC, Detroit, MI (US)

(72) Inventors: Vincent J. Tylutki, Livonia, MI (US); Christopher Whitt, Howell, MI (US); Cristian Taibi, Turin (IT); Michelangelo Ardanese, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/188,106

(22) Filed: Feb. 24, 2014

(65) Prior Publication Data

US 2015/0240695 A1 Aug. 27, 2015

(51) Int. Cl.
  *F01N 3/00* (2006.01)
  *F01N 11/00* (2006.01)
  *F01N 3/10* (2006.01)
  *F01N 3/20* (2006.01)
  *F01N 3/021* (2006.01)

(52) U.S. Cl.
  CPC .............. *F01N 11/002* (2013.01); *F01N 3/021* (2013.01); *F01N 3/103* (2013.01); *F01N 3/2066* (2013.01); *F01N 2550/04* (2013.01); *F01N 2560/06* (2013.01); *F01N 2560/14* (2013.01); *F01N 2900/1404* (2013.01); *F01N 2900/1411* (2013.01); *F01N 2900/1606* (2013.01)

(58) Field of Classification Search
  CPC ....... F01N 11/002; F01N 3/035; F01N 3/103; F01N 3/2033; F01N 3/2066; F01N 2560/06; F01N 2560/14; F01N 2610/03; F01N 2900/1404; F01N 2900/1621

USPC .................................................. 60/277, 311
  See application file for complete search history.

(56) References Cited

U.S. PATENT DOCUMENTS

| | | | | |
|---|---|---|---|---|
| 6,634,170 | B2 * | 10/2003 | Hiranuma et al. | 60/295 |
| 2003/0217549 | A1 * | 11/2003 | Watanabe et al. | 60/285 |
| 2006/0016180 | A1 * | 1/2006 | Tomita et al. | 60/297 |
| 2009/0044515 | A1 * | 2/2009 | Lu et al. | 60/277 |
| 2009/0097528 | A1 * | 4/2009 | Simon et al. | 374/160 |
| 2009/0205318 | A1 * | 8/2009 | Shibata et al. | 60/277 |
| 2009/0266060 | A1 * | 10/2009 | Guo et al. | 60/295 |
| 2012/0282159 | A1 * | 11/2012 | Takayanagi et al. | 423/212 |
| 2013/0145822 | A1 * | 6/2013 | Karlsson et al. | 73/23.31 |

FOREIGN PATENT DOCUMENTS

GB  2494931  *  3/2013

* cited by examiner

*Primary Examiner* — Jesse Bogue
*Assistant Examiner* — Matthew T Largi
(74) *Attorney, Agent, or Firm* — Cantor Colburn LLP

(57) ABSTRACT

A method for determining an over-temperature condition in an exhaust gas treatment system is provided. The method compares a current soot load in a particulate filter with a threshold soot load. The method compares each of a plurality of temperatures sensed by a plurality of temperature sensors with a threshold temperature. Based on determining that the current soot load in a particulate filter of the exhaust gas treatment system exceeds a threshold soot load and that one of the plurality of temperatures exceeds the threshold temperature, the method determines that the exhaust gas treatment system is in an over-temperature condition. Based on determining that the current soot load in the particular filter does not exceed the threshold soot load and that two or more of the plurality of temperatures exceed the threshold temperature, the method determines that the exhaust gas treatment system is in an over-temperature condition.

20 Claims, 3 Drawing Sheets

DETECTING OVER-TEMPERATURE IN EXHAUST SYSTEM

FIELD OF THE INVENTION

The subject invention relates to exhaust systems and, more specifically, to detecting over-temperature in exhaust systems.

BACKGROUND

Manufacturers of internal combustion engines, particularly diesel engines, are presented with the challenging task of complying with current and future emission standards for the release of nitrogen oxides, particularly nitrogen monoxide, as well as unburned and partially oxidized hydrocarbons, carbon monoxide, particulate matter, and other particulates. In order to reduce the emissions of internal combustion engines, an exhaust gas treatment system is used to reduce particulates from the exhaust gas flowing from the engine.

An exhaust gas treatment system typically includes one or more treatment devices, such as particulate filters, catalytic converters, mixing elements and urea/fuel injectors. The treatment devices are designed to operate at the temperature of the exhaust gas. For example, a treatment device has an operating temperature. The operating temperature is the temperature at which the treatment device effectively and efficiently alters exhaust gas constituents or removes the desired particulates from the exhaust gas.

At times, the exhaust gas temperature may reach too high a point and reach the structural limits of the treatment devices. For instance, the temperature in a particulate filter may be raised to burn off the particulates in the filter to regenerate the filter. However, during this regeneration process, the temperature of the exhaust gas in the filter may reach beyond a point that the filter can sustain its structure. Also, other treatment devices associated with the filter may also reach structural limits from the high heat. Such high temperature condition in which the treatment devices are subject to structural limits is referred to as an over-temperature condition.

When an over-temperature condition is detected in the exhaust system, some vehicles alter their operations in order to prevent temperatures from exceeding the structural limits of the exhaust gas treatment devices. For instance, some vehicles are put in a limp-home mode, in which the vehicles operate in a limited fashion. Therefore, detecting an over-temperature condition accurately (or avoiding false detection of an over-temperature condition) is desirable in order to prevent vehicles from operating in a limited fashion when they do not have to.

SUMMARY OF THE INVENTION

In one exemplary embodiment of the invention, a method for determining an over-temperature condition in an exhaust gas treatment system is provided. The method comprises comparing a current soot load in a particulate filter of the exhaust gas treatment system with a threshold soot load; comparing each of a plurality of temperatures sensed by a plurality of temperature sensors with a threshold temperature; determining that the exhaust gas treatment system is in an over-temperature condition based on determining that the current soot load in a particulate filter of the exhaust gas treatment system exceeds a threshold soot load and that one of the plurality of temperatures exceeds the threshold temperature; and determining that the exhaust gas treatment system is in an over-temperature condition based on determining that the current soot load in the particular filter does not exceed the threshold soot load and that two or more of the plurality of temperatures exceed the threshold temperature.

In another exemplary embodiment of the invention, an over-temperature monitoring system for an exhaust gas treatment system is provided. The over-temperature monitoring system includes: a first module configured to compare a current soot load in a particulate filter of the exhaust gas treatment system with a threshold soot load; a second module configured to compare each of a plurality of temperatures sensed by a plurality of temperature sensors with a threshold temperature; a third module configured to determine that the exhaust gas treatment system is in an over-temperature condition based on determining by the first module that the current soot load in a particulate filter of the exhaust gas treatment system exceeds a threshold soot load and further based on determining by the second module that one of the plurality of temperatures exceeds the threshold temperature; and a fourth module configured to determine that the exhaust gas treatment system is in an over-temperature condition based on determining by the first module that the current soot load in the particular filter does not exceed the threshold soot load and further based on determining by the second module that two or more of the plurality of temperatures exceed the threshold temperature.

In yet another exemplary embodiment of the invention, an exhaust gas treatment system for an engine. The exhaust gas treatment system includes: a particulate filter; a plurality of temperature sensors disposed in different locations in the exhaust gas treatment system; a control module configured to compare a current soot load in a particulate filter of the exhaust gas treatment system with a threshold soot load, compare each of a plurality of temperatures sensed by a plurality of temperature sensors with a threshold temperature, determine that the exhaust gas treatment system is in an over-temperature condition based on determining that the current soot load in a particulate filter of the exhaust gas treatment system exceeds a threshold soot load and that one of the plurality of temperatures exceeds the threshold temperature, and determine that the exhaust gas treatment system is in an over-temperature condition based on determining that the current soot load in the particular filter does not exceed the threshold soot load and that two or more of the plurality of temperatures exceed the threshold temperature.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
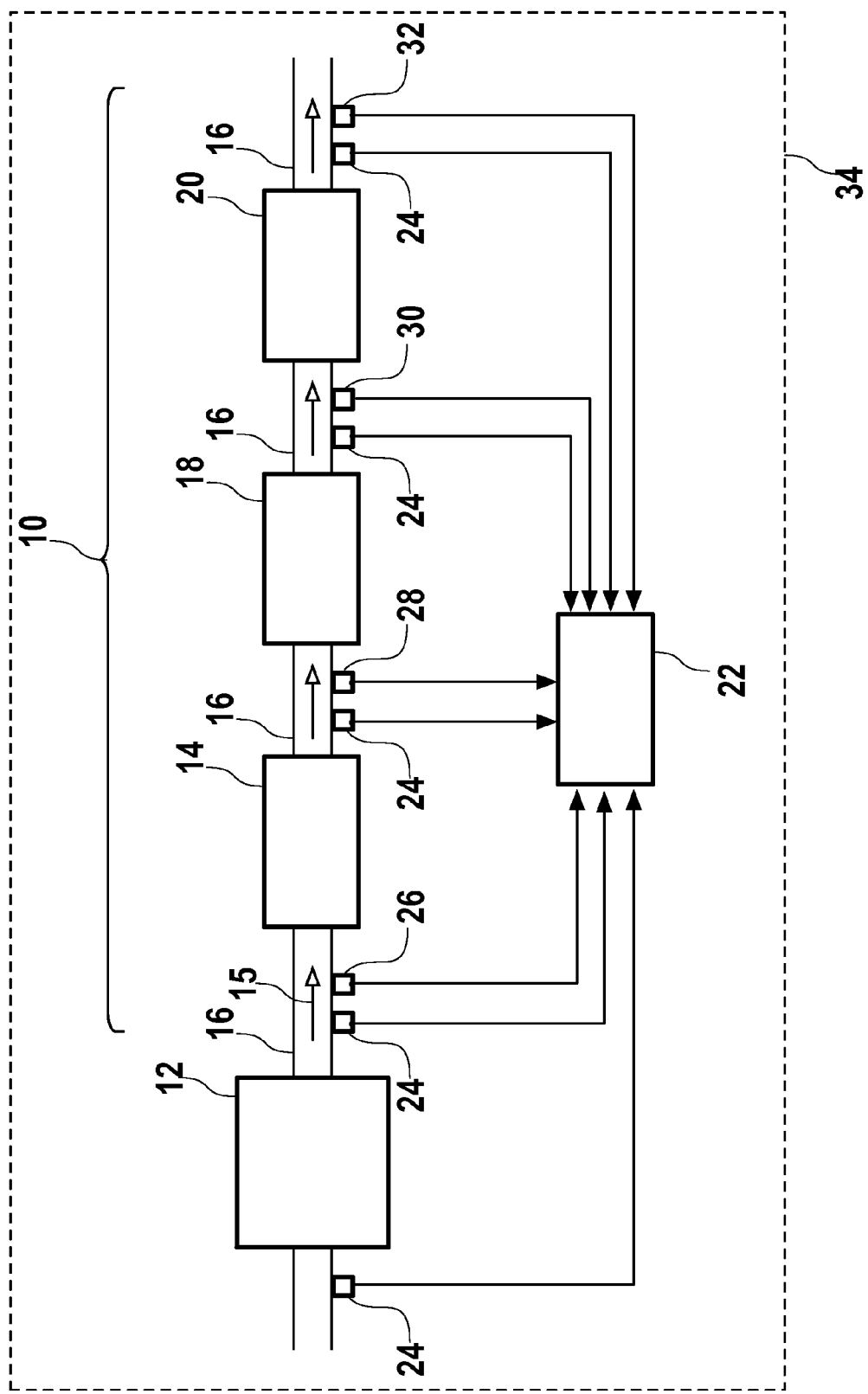
FIG. 1 is a functional block diagram of a vehicle including an exhaust gas treatment system in accordance with exemplary embodiments.

The following description is merely exemplary in nature and is not intended to limit the present disclosure, its application or uses. It should be understood that throughout the drawings, corresponding reference numerals indicate like or corresponding parts and features.

As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

In accordance with an exemplary embodiment of the invention, FIG. 1 depicts an exhaust gas treatment system 10 for the reduction of regulated exhaust gas constituents of an internal combustion engine 12, including an engine of a vehicle 34 as well as engines used in various non-vehicular applications. As can be appreciated, the engine 12 can be of any engine type including, but not limited to, a diesel engine, a gasoline direct injection engine, a homogeneous charge compression ignition engine, or other engine type.

The exhaust gas treatment system 10 generally includes one or more exhaust gas conduits 16, and one or more exhaust gas treatment devices. In various embodiments, the exhaust gas treatment devices may include and an oxidation catalyst (OC) device 14, a selective catalytic reduction (SCR) device 18, a particulate filter (PF) 20 and/or other treatment device (not depicted).

The exhaust gas conduits 16 transport exhaust gas 15 from the engine 12 to the various exhaust gas treatment devices of the exhaust gas treatment system 10. The exhaust gas 15 flows through the exhaust gas treatment system 10 for the removal or reduction of particulates and is then released into the atmosphere.

The OC 14 may include a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits or passages. An oxidation catalyst compound may be applied as a wash coat and may contain platinum group metals such as platinum (Pt), palladium (Pd), rhodium (Rh) or other suitable oxidizing catalysts.

The SCR device 18 may also include a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduits. The substrate may include an SCR catalyst composition applied thereto. The SCR catalyst composition may contain a zeolite and one or more base metal components such as iron (Fe), cobalt (Co), copper (Cu) or vanadium (V) which can operate efficiently to convert NOx constituents in the exhaust gas 15 in the presence of a reductant such as ammonia ($NH_3$).

The particulate filter (PF) 20 may be disposed downstream of the SCR device 18. The PF 20 operates to filter the exhaust gas 15 of carbon and other particulates. In embodiments, the PF 20 may be constructed using a ceramic wall flow monolith filter that is wrapped in an intumescent mat or other suitable support that expands when heated, securing and insulating the filter. The filter may be packaged in a rigid shell or canister that is, for example, constructed of stainless steel, and that has an inlet and an outlet in fluid communication with exhaust gas conduits. The ceramic wall flow monolith filter may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 15 entering the filter through the inlet ends of the inlet passages is forced to migrate through adjacent longitudinally extending walls to the outlet passages. It is through this exemplary wall flow mechanism that the exhaust gas 15 is filtered of carbon (soot) and other particulates. The filtered particulates are deposited on the longitudinally extending walls of the inlet passages and, over time, will have the effect of increasing the exhaust gas backpressure experienced by the internal combustion engine 12. The accumulation of particulate matter within the PF 20 is periodically removed by cleaning or regeneration to reduce backpressure. Regeneration involves the oxidation or burning of accumulated carbon and other particulates in what is typically a high temperature (>600° C.) environment.

The OC 14, the SCR device 18 and the PF 20 may each have a selected operating temperature at which the device effectively and efficiently removes particulates or alters the exhaust gas. For example, the SCR device 18 has an operating temperature for exhaust gas received at which the device converts NO to $NO_2$ at or above the selected temperature. In addition, the OC 14 may be used to combust hydrocarbon ("HC") in an exothermic reaction that is effective to combust the accumulated particulates in the PF 20. Initiation of the PF 20 regeneration typically occurs at a selected operating temperature, wherein the exothermic reaction causes the exhaust gas 15 temperature to attain the temperature at which the accumulated particulates burn/combust.

A control module (or a controller) 22 controls the engine 12 and/or one or more exhaust components based on sensed and/or modeled data. The data can be received from several sensors 24-32 of the exhaust gas treatment system 10. In various embodiments, the sensed and/or modeled data include exhaust gas temperature, exhaust flow rates, soot loads, NOx concentrations, exhaust gas constituencies (chemical composition) and many other parameters. For simplicity of description, the sensors 24 are assumed to sense and/or model these various parameters, and the sensor 26-32 are assumed to be temperature sensors that senses and/or models the exhaust gas temperature.

In various embodiments, the sensors 24-32 are disposed at different locations of the exhaust gas treatment system 10. More specifically, the sensors are disposed upstream and downstream of the exhaust gas treatment devices. For instance, in various embodiments, a first temperature sensor 26 is disposed upstream of the OC device 14; a second temperature sensor 28 is disposed downstream of the OC device 14 or upstream of the SCR device 18; a third temperature sensor 30 is disposed downstream of the SCR device 18 or upstream of the PF 20; and a fourth temperature sensor 32 is disposed downstream of PF 20. In various embodiments, these temperature sensors sense exhaust gas temperatures and report the sensed temperatures to the control module 22.

The sensors 24 sense exhaust gas flow at one or more locations of the exhaust gas treatment system 10. The sensors 24 or control module 22 computes the flow rate at the location(s) based on the sensed flow volume(s). Also, the current soot load in the PF 20 may be calculated using a suitable method known or to be developed in the art. For example, the current soot load in the PF 20 may be calculated based on exhaust flow rate upstream and/or downstream of the PF 20.

The control module 22 is configured to perform selected processes or operations based on the sensed and/or modeled data, such as determining an over-temperature condition in the exhaust gas treatment system 10. In an exemplary embodiment, the control module 22 determines an over-temperature condition in the exhaust gas treatment system 10 based on exhaust gas temperature sensed at one or more temperature sensors 26-32 and the soot load in the PF 20. The control module 22 may determine an over-temperature condition in the exhaust gas treatment system 10 further based on exhaust gas flow rate at one or more locations of the exhaust gas treatment system 10.

In various embodiments, the control module 22 determines whether the current soot load in the PF 20 (i.e., the amount of soot accumulated in the PF 20) is low or moderate. In various embodiments, the control module 22 uses a predefined threshold load to determine whether the current soot load is low or moderate. The control module 22 compares the current soot load with the predefined threshold load. When the current soot load exceeds this threshold load, the module 22 determines that the current soot load is moderate. When the current soot load does not exceed the threshold load, the module 22 determines that the current soot load in the PF 20 is low.

When the current soot load in the PF 20 is determined to be moderate, the control module 22 uses a single temperature sensor to determine an over-temperature condition in the exhaust gas treatment system 10. More specifically, when the current soot load is moderate, the control module 22 determines whether any one of the temperature sensors 26-32 has sensed a temperature that is over a threshold temperature. In various embodiments, this threshold temperature is predetermined to be a temperature that is close to a point at which the exhaust gas treatment devices have reached a structural limit. In various embodiments, a single threshold temperature is used for all of the temperature sensors. Alternatively, a different threshold temperature may be used for each of the temperature sensors. When the current soot load in the PF 20 is determined to be moderate and at least one of the temperatures sensors reports a temperature that exceeds the threshold temperature, the control module 22 determines that the exhaust gas treatment system 10 is in an over-temperature condition.

When the current soot load in the PF 20 is determined to be low, the control module 22 uses more than one temperature sensor to determine over-temperature in the exhaust gas treatment system 10. More specifically, when the current soot load in the PF 20 is determined to be low, the control module 22 determines whether two or more of the temperature sensors have sensed temperatures that are over the threshold temperature. When the current soot load in the PF 20 is determined to be low and two or more temperature sensors report exhaust gas temperatures that exceed the threshold temperature, the control module 22 determines that the exhaust gas treatment system 10 in an over-temperature condition.

When it is determined that the exhaust gas treatment system 10 is in an over-temperature condition, the control module 22 may direct the engine 12 and/or the exhaust gas treatment system 10 to operate in a limp-home mode. In various embodiments, the control module 22 may also generate a diagnostic trouble code (DTC) that indicates that the exhaust gas treatment system 10 is in an over-temperature condition.

In various embodiments, the control module 22 dynamically adjusts the threshold temperature based on the exhaust gas flow rate. For instance, the higher the exhaust gas flow rate is, the higher is the threshold temperature that the control module 22 uses to compare with the temperatures that the temperature sensors report. The control module 22 uses a lower threshold temperature when the exhaust gas flow rate is lower. In various embodiments, the control module 22 uses an exhaust gas flow rate measured for one location of the exhaust gas treatment system 10. Alternatively, the control module 22 uses a particular flow rate measured near a particular temperature sensor to determine whether the particular temperature sensor indicates an over-temperature condition. In various embodiments, the control module 22 compares the exhaust gas flow rate with one or more threshold flow rates in order to determine whether to adjust the threshold temperature.

In various embodiments, the control module 22 adjusts the threshold temperature based on the number of temperature sensors that are going to be used for determining an over-temperature condition. That is, when a single temperature sensor is going to be used because the current soot load is moderate, the control module 22 increases the threshold temperature. When multiple temperature sensors are going to be used because the current soot load is low, the control module 22 may decrease the threshold temperature.

It is to be noted that the exhaust gas treatment system 10 should not be limited to the configuration illustrated in FIG. 1. For instance, the exhaust gas treatment devices 14-20 may be disposed in the exhaust gas treatment system in an order that is different than the depicted order of the OC 10, the SCR 18, and then the PF 20. Moreover, there may be more or different exhaust gas treatment devices disposed in the exhaust gas treatment system 10. For instance, another OC device may be disposed between the SCR device 18 and the PF 20. In this case, additional sensors may be disposed in the exhaust gas treatment system 10. For instance, another temperature sensor may be placed between the additional OC device and the PF 20.

Figure 2:
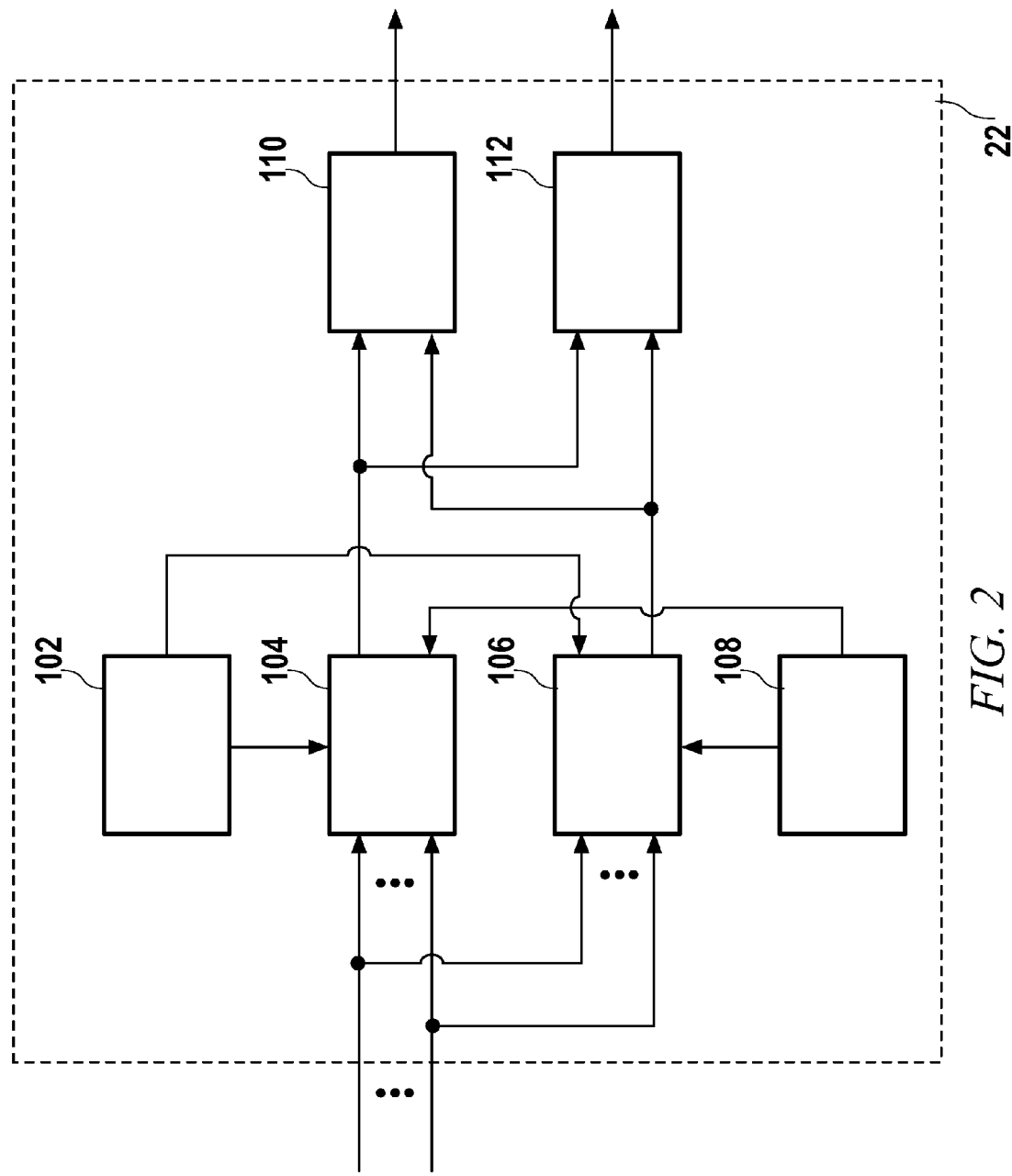
FIG. 2 is a dataflow diagram illustrating a controller of the exhaust gas treatment system of FIG. 1 in accordance with exemplary embodiments.

Referring now to FIG. 2, a dataflow diagram illustrates various embodiments of the control module 22 of the exhaust gas treatment system 10 of FIG. 1. Various embodiments of the control module 22 according to the present disclosure may include any number of sub-modules. As can be appreciated, the sub-modules shown in FIG. 2 may be combined and/or further partitioned. Inputs to the control module 22 may be sensed from the sensors 24-32 of FIG. 1 as well as other sensors (not shown) within the vehicle 34, received from other control modules (not shown), and/or determined/modeled by other sub-modules (not shown) within the control module 22. In various embodiments, the control module 22 includes a soot load determination module 102, a single sensor evaluation module 104, a multiple sensor evaluation module 106, a flow rate computation module 108, a control command module 110, and a diagnostic code generation module 112.

The soot load determination module 102 is configured to determine whether the current soot load in the PF 20 of FIG. 1 is low or moderate. In various embodiments, the soot load determination module 102 first determines the current soot load in the PF 20 using suitable methods that are known or to be developed in the art. For example, the soot load determination module 102 may compute the soot load based on exhaust gas flow rates sensed in upstream and/or downstream of the PF 20. Alternatively, the soot load determination module 102 does not determine the current soot load. Instead, the soot load determination module 102 receives the current soot load that is sensed or computed by one or more of the sensors 24-32 of FIG. 1.

The soot load determination module 102 then determines whether the current soot load in the PF 20 is low or moderate. In various embodiments, the soot load determination module 102 uses a predefined threshold load to determine whether the current soot load is low or moderate. The soot load determination module 102 compares the current soot load with the predefined threshold load. When the current soot load exceeds this threshold load, the soot load determination module 102 determines that the current soot load is moderate. When the current soot load does not exceed the threshold load, the soot load determination module 102 determines that the current soot load in the PF 20 is low. The soot load determination module 102 informs the single sensor evaluation module 104 and the multiple sensor evaluation module 106 regarding the status (e.g., low or moderate) of the soot load in the PF 20.

The flow rate computation module 108 is configured to determine the exhaust gas flow rates for the exhaust gas treatment system 10. In various embodiments, the flow rate computation module 108 receives measured values of different parameters (e.g., an intake air pressure, an exhaust gas pressure, an exhaust gas temperature, etc.) from the sensors 24-32 and computes the exhaust gas flow rate using any suitable method. Alternatively, the flow rate computation module 108 receives flow rates computed by the sensors themselves. In various embodiments, the flow rate computation module 108 computes a flow rate for the exhaust gas treatment system 10 or for each of different locations of the sensors 24-32.

The single sensor evaluation module 104 is configured to determine an over-temperature condition of the exhaust gas treatment system 10 of FIG. 1 when the soot load determination module 102 determines that the current soot load in the PF 20 is moderate. The single sensor evaluation module 104 receives sensed temperatures from the temperature sensors 26-32 of FIG. 1. The single sensor evaluation module 104 determines that the exhaust gas treatment system 10 is in an over-temperature condition when any one of the temperature sensors 26-32 reports a temperature that is at or above a threshold temperature. When the single sensor evaluation module 104 determines that the exhaust gas treatment system 10 is in an over-temperature condition, the single sensor evaluation module 104 notifies the control command module 110 and diagnostic code generation module 112.

In various embodiments, the single sensor evaluation module 104 adjusts the threshold temperature that the single sensor evaluation module 104 uses based on the exhaust gas flow rate that the module 104 receives from the flow rate computation module 108. Generally, when the exhaust gas flow rate becomes higher or lower (i.e., when larger or smaller volume of the exhaust gas per unit of time passes through a sensor than before), the single sensor evaluation module 104 increases or decreases the threshold temperature. In various embodiments, the single sensor evaluation module 104 uses a set of equations to compute dynamically the threshold temperature based on an input exhaust gas flow rate. Alternatively or conjunctively, the single sensor evaluation module 104 may use a table of threshold temperatures to look up a threshold temperature for a given exhaust gas flow rate.

In various embodiments, the single sensor evaluation module 104 uses a different threshold temperature for each of the temperature sensors 26-32. That is, a first threshold temperature that the single sensor evaluation module 104 compares with a temperature sensed by a first temperature sensor is different than a second threshold temperature that the single sensor evaluation module 104 compares with a temperature sensed by a second temperature sensor. In various embodiments, these different threshold temperatures are predetermined based on the location of the temperature sensor within the exhaust gas treatment system 10. Moreover, in various embodiments, the single sensor evaluation module 104 adjusts these different threshold temperatures differently. For instance, the single sensor evaluation module 104 uses a different set of equations or a different table to come up with a different threshold temperature for each of the temperature sensors based on the location of the temperature sensor.

The multiple sensor evaluation module 106 is configured to determine an over-temperature condition of the exhaust gas treatment system 10 of FIG. 1 when the soot load determination module 102 determines that the current soot load in the PF 20 is low. The multiple sensor evaluation module 106 receives sensed temperatures from the temperature sensors 26-32 of FIG. 1. The multiple sensor evaluation module 106 determines that the exhaust gas treatment system 10 is in an over-temperature condition when two or more of the temperature sensors 26-32 report temperatures that are at or above a threshold temperature. When the multiple sensor evaluation module 106 determines that the exhaust gas treatment system 10 is in an over-temperature condition, the multiple sensor evaluation module 106 notifies the control command module 110 and diagnostic code generation module 112.

In various embodiments, like the single sensor evaluation module 104, the multiple sensor evaluation module 106 adjusts the threshold temperature that the multiple sensor evaluation module 106 uses based on the exhaust gas flow rate that the module 106 receives from the flow rate computation module 108. That is, the multiple sensor evaluation module 106 increases or decreases the threshold temperature as the exhaust gas flow rate becomes higher or lower. The multiple sensor evaluation module 106 may also use a set of equations or a table to compute dynamically or to look up a threshold temperature for a given exhaust gas flow rate.

In various embodiments, the multiple sensor evaluation module 106 also uses a different predetermined threshold temperature for each of the temperature sensors 26-32. Moreover, in various embodiments, the multiple sensor evaluation module 106 also uses a different set of equations or a different table to come up with a different threshold temperature for each of the temperature sensors based on the location of the temperature sensor.

In various embodiments, the multiple sensor evaluation module 106 generally uses a threshold temperature that is smaller than a corresponding threshold temperature that the single sensor evaluation module 104 uses. That is, when each of the single and multiple sensor evaluation modules 104 and 106 uses a single threshold temperature for the temperature sensors, the single threshold temperature used by the multiple sensor evaluation module 106 is smaller than the single threshold temperature used by the single sensor evaluation module 104. Likewise, when the single and multiple sensor evaluation modules 104 and 106 use different threshold temperatures for different temperature sensors, a particular threshold temperature for a particular temperature sensor that the multiple sensor evaluation module 106 uses is smaller than the threshold temperature that the single sensor evaluation module 104 uses for the particular temperature sensor.

The control command module 110 receives the outputs of the single sensor evaluation module 104 and the multiple sensor evaluation module 106 and controls the engine 12 and/or the treatment devices in the exhaust gas treatment system 10. For instance, when the single sensor evaluation module 104 or the multiple sensor evaluation module 106 indicates that the exhaust gas treatment system 10 is in an over-temperature condition, the control command module 110 may direct the vehicle 34 to operate in a limp home mode by commanding different components of the vehicle 34 (e.g., a transmission system, the engine 12, the exhaust gas treatment system 10, etc.).

The diagnostic code generation module 112 also receives the outputs of the single and multiple sensor evaluation modules 104 and 106 and generates an appropriate diagnostic trouble code (DTC). The diagnostic code generation module 112 sends the generated DTC to one or more other modules (not shown) of the vehicle 34 to provide diagnostic information to a technician or to a driver of the vehicle 34.

Figure 3:
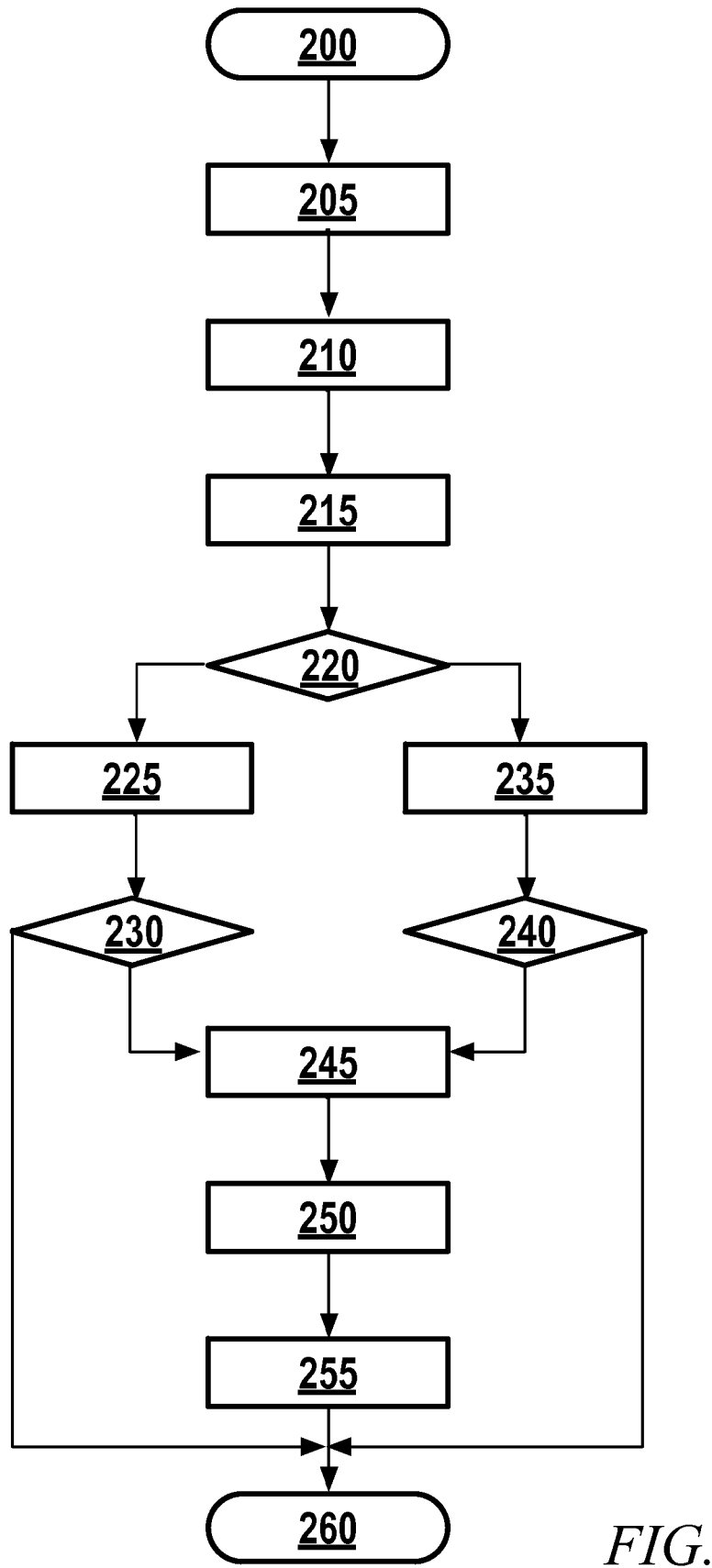
FIG. 3 is a flowchart illustrating a method that may be performed by the controller of FIG. 2 in accordance with exemplary embodiments.

Referring now to FIG. 3, and with continued reference to FIGS. 1 and 2, a flowchart illustrates a method for determining an over-temperature condition in an exhaust gas treatment system of a vehicle. In various embodiments, the method can be performed by the control module 22 of FIGS. 1 and 2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In various embodiments, the method can be scheduled to run based on predetermined events, and/or run continually during operation of the engine 12.

In one example, the method may begin at block 200. At block 205, the soot load determination module 102 of the control module 22 determines the current soot load in the PF 20. At block 210, the flow rate computation module 108 determines exhaust gas flow rate for the exhaust gas treatment system 10. In various embodiments, the flow rate computation module 108 may determine an exhaust gas flow rate for each of different locations of the temperature sensors 26-32 based on the sensed data received from the sensors 24.

At block 215, the single sensor evaluation module 104 and the multiple sensor evaluation module 106 determine a threshold temperature to compare with temperatures reported by the temperature sensors 26-32. The modules 104 and 106 may determine one threshold temperature for all of the temperature sensors or a separate threshold temperature for each of the temperature sensors. The modules 104 and 106 may use a set of equations to compute the threshold temperature(s) or may use a set of tables to look up the threshold temperature(s).

At block 220, the soot load determination module 102 compares the current soot load (determined at block 205) with a threshold load in order to determine whether the current soot load in the PF 20 is low or moderate. Based on determining that the current soot load is moderate (i.e., the current soot load is greater than or equal to the threshold load), the method continues to block 225. Otherwise, the method continues to block 235.

At block 225, the single sensor evaluation module 104 optionally adjusts the threshold temperature(s). Specifically, the single sensor evaluation module 104 may increase the threshold temperature(s) so that any sensor has to report a higher temperature in order for the single sensor evaluation module 104 to determine that the exhaust gas treatment system 10 is in an over-temperature condition.

At block 230, the single sensor evaluation module 104 determines whether any one of the temperature sensors 26-32 reports a temperature that is greater than or equal to a threshold temperature for the temperature sensor. Based on determining that at least one of the temperature sensors 26-32 reports a temperature that is greater than or equal to a threshold temperature for the temperature sensor, the method continues at block 245. Otherwise, the method ends at block 260.

At block 235, the multiple sensor evaluation module 106 optionally adjusts the threshold temperature(s). Specifically, the multiple sensor evaluation module 106 may decrease the threshold temperature(s) so that two or more temperature sensors may report lower temperatures in order for the multiple sensor evaluation module 106 to determine that the exhaust gas treatment system 10 is in an over-temperature condition.

At block 240, the multiple sensor evaluation module 106 determines whether two or more of the temperature sensors 26-32 report temperatures that are greater than or equal to a threshold temperature for the temperature sensors. Based on determining that two or more of the temperature sensors 26-32 report temperatures that are greater than or equal to a threshold temperature for each of the two or more temperature sensors, the method continues at block 245. Otherwise, the method ends at block 260.

At block 245, the single and multiple sensor evaluation modules 104 and 106 determine that the exhaust gas treatment system 10 is in an over-temperature condition. At block 250, the control command module 110 directs the vehicle 34 to operate in a limited fashion (e.g., in a limp-home mode). At block 255, the diagnostic code generation module generates a DTC that indicates the exhaust gas treatment system is in an over-temperature condition. The method then ends at block 260.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for determining an over-temperature condition in an exhaust gas treatment system of a vehicle, the method comprising:
   comparing a current soot load in a particulate filter of the exhaust gas treatment system with a threshold soot load;
   comparing each of a plurality of temperatures sensed by a plurality of temperature sensors with a threshold temperature; and
   improving an accuracy of an over-temperature condition evaluation of the exhaust gas treatment system in response to selectively performing first and second different exhaust gas temperature evaluations based on an amount of the current soot load,
   the first exhaust gas temperature evaluation comprising:
      determining the current soot load is at a moderate level in response to the current soot load exceed the threshold soot load; and
      based on determining that the current soot load in a particulate filter of the exhaust gas treatment system is at a moderate level, determining that the exhaust gas treatment system is in the over-temperature condition in response to only one temperature sensor among the plurality of temperatures exceeding the threshold temperature; and
   the second exhaust gas temperature evaluation comprising:
      determining the current soot load is at a low level that is less than the moderate level in response to the current soot load falling below the threshold soot load; and
      based on determining that the current soot load in the particular filter is at the low level, determining that the exhaust gas treatment system is in the over-temperature condition in response to two or more temperature sensors among the plurality of temperature sensors exceeding the threshold temperature; and restricting at least one of an engine and transmission of the vehicle so as to restrict operation of the vehicle in response to determining the over-temperature condition.

2. The method of claim 1 further comprising adjusting the threshold temperature based on an exhaust gas flow rate for the exhaust gas treatment system.

3. The method of claim 2, wherein the adjusting the threshold temperature comprises:
increasing the threshold temperature based on determining that the exhaust gas flow rate is above a threshold flow rate; and
decreasing the threshold temperature based on determining that the exhaust gas flow rate is below a threshold flow rate.

4. The method of claim 2, wherein the adjusting the threshold temperature comprises finding a threshold temperature by looking up a table of different threshold temperatures for different exhaust gas flow rates.

5. The method of claim 1 further comprising determining a different threshold temperature for each of the plurality of the temperature sensors.

6. The method of claim 1 further comprising increasing the threshold temperature based on determining that the current soot load in the particulate filter exceeds the threshold soot load.

7. The method of claim 1 further comprising decreasing the threshold temperature based on determining that the current soot load in the particular filter does not exceed the threshold soot load.

8. The method of claim 1 further comprising generating a diagnostic trouble code (DTC) based on determining that that the exhaust gas treatment system is in an over-temperature condition.

9. The method of claim 1, wherein the exhaust gas treatment system comprises a plurality of exhaust gas treatment components including the particulate filter, wherein the plurality of temperature sensors are disposed upstream and downstream of the exhaust gas treatment components.

10. An over-temperature monitoring system for improving an accuracy of evaluating an over-temperature condition of an exhaust gas treatment system included in a vehicle, comprising:
a first module including an electronic processor having electronic memory that stores computer readable instructions that, when executed by the microprocessor is configured to compare a current soot load in a particulate filter of the exhaust gas treatment system with a threshold soot load, the first module configured to determine that the current soot load is at a moderate soot level when the current soot load exceeds the threshold soot load and to determine that the current soot load is at a low soot level less than the moderate level when the current soot load falls below the threshold soot load;
a second module including an electronic processor having electronic memory that stores computer readable instructions that, when executed by the microprocessor is configured to compare each of a plurality of temperatures sensed by a plurality of temperature sensors with a threshold temperature; and
third and fourth modules each including an electronic processor having electronic memory that stores computer readable instructions that, when executed by the microprocessor, are selectively activated to perform first and second different exhaust gas temperature evaluations based on determining the low and moderate soot levels, respectively to improve the accuracy of an over-temperature condition evaluation, wherein the selective activation of the third and fourth module comprises:
activating the third module in response to determining the low soot level to determine that the exhaust gas treatment system is in an over-temperature condition based on determining by the second module that a temperature output from only one temperature sensor among the plurality of temperatures exceeds the threshold temperature; or
activating the fourth module in response to determining the moderate soot level to determine that the exhaust gas treatment system is in an over-temperature condition based on determining by the second module that temperatures output from two or more temperature sensors among the plurality of temperatures exceed the threshold temperature,
the third and fourth modules further configured to output a command signal that restricts at least one of an engine and transmission of the vehicle so as to restrict operation of the vehicle in response to determining the over-temperature condition.

11. The over-temperature monitoring system of claim 10, wherein the second module is further configured to adjust the threshold temperature based on an exhaust gas flow rate for the exhaust gas treatment system.

12. The over-temperature monitoring system of claim 10, wherein the second module is further configured to determine a different threshold temperature for each of the plurality of the temperature sensors.

13. The over-temperature monitoring system of claim 10, wherein the second module is further configured to adjust the threshold temperature based on the current soot load in the particulate filter.

14. The over-temperature monitoring system of claim 10, wherein the exhaust gas treatment system comprises a plurality of exhaust gas treatment components including the particulate filter, wherein the plurality of temperature sensors are disposed upstream and downstream of each of the exhaust gas treatment components.

15. An exhaust gas treatment system for treating exhaust generated by an engine of a vehicle, comprising:
a particulate filter;
a plurality of temperature sensors disposed in different locations in the exhaust gas treatment system;
a control module configured to:
compare a current soot load in a particulate filter of the exhaust gas treatment system with a threshold soot load;
compare each of a plurality of temperatures sensed by a plurality of temperature sensors with a threshold temperature;
improve an accuracy of an over-temperature condition evaluation of the exhaust gas treatment system in response to selectively performing first and second different exhaust gas temperature evaluations based on an amount of the current soot load,
the first exhaust gas temperature evaluation comprising:
determining the current soot load is at a moderate level in response to the current soot load exceeding the threshold soot load; and
based on determining that the current soot load in a particulate filter of the exhaust gas treatment system is at the moderate level, determining that the exhaust gas treatment system is in an over-temperature condition in response to only one temperature sensor among the plurality of temperatures exceeding the threshold temperature; and the second exhaust gas temperature evaluation comprising:
determining the current soot load is at a low level that is less than the moderate level in response to the current soot load falling below the threshold soot load; and
based on determining that the current soot load is at the low level, determining that the exhaust gas treatment system is in an over-temperature condition in response to two or more of the plurality of temperatures exceeding the threshold temperature; and restrict at least one of the engine and transmission of the vehicle so as to restrict operation of the vehicle in response to determining the over-temperature condition.

16. The exhaust gas treatment system of claim 15, wherein the control module is further configured to adjust the threshold temperature based on an exhaust gas flow rate for the exhaust gas treatment system.

17. The exhaust gas treatment system of claim 15, wherein the control module is further configured to determine a different threshold temperature for each of the plurality of the temperature sensors.

18. The exhaust gas treatment system of claim 15, wherein the control module is further configured to increase the threshold temperature based on determining that the current soot load in the particulate filter exceeds the threshold soot load.

19. The exhaust gas treatment system of claim 15, wherein the control module is further configured to decrease the threshold temperature based on determining that the current soot load in the particular filter does not exceed the threshold soot load.

20. The exhaust gas treatment system of claim 15 further comprising a plurality of exhaust gas treatment components including the particulate filter, wherein the plurality of temperature sensors are disposed upstream and downstream of each of the exhaust gas treatment components.

\* \* \* \* \*